No. 875,842. PATENTED JAN. 7, 1908.
M. PAULSON.
ADJUSTABLE TAPER TAP.
APPLICATION FILED FEB. 17, 1905.

WITNESSES:
F. E. Gaither.
R. J. Cook.

Maurice Paulson, INVENTOR,
By Paul Synnestvedt
Atty.

UNITED STATES PATENT OFFICE.

MAURICE PAULSON, OF CHICAGO, ILLINOIS, ASSIGNOR TO CRANE COMPANY, OF CHICAGO, ILLINOIS, A CORPORATION OF ILLINOIS.

ADJUSTABLE TAPER TAP.

No. 875,842.  Specification of Letters Patent.  Patented Jan. 7, 1908.

Application filed February 17, 1905. Serial No. 246,006.

*To all whom it may concern:*

Be it known that I, MAURICE PAULSON, a citizen of the United States, residing at Chicago, in the State of Illinois, have invented a certain new and useful Adjustable Taper Tap, of which the following is a specification.

My invention relates to tools for cutting interior threads in pipes and the like, and particularly to taps designed to cut taper threads.

The objects of my invention are, to provide a taper tap which may be ground off at the cutting end when worn, without altering the length of the thread cutting portion or its angularity; to provide convenient means for holding a two-part taper tap in position and to mount it so that it may be extended from the chuck when desired, or to vary the taper line when this may be required.

These objects and other advantages which will hereinafter appear, I attain by means of the construction illustrated in preferred form in the accompanying drawing wherein—

Figure 1:
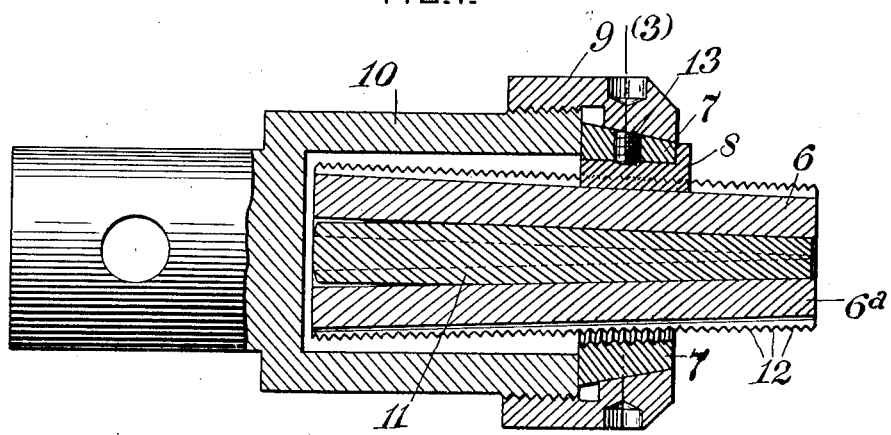
Figure 2:
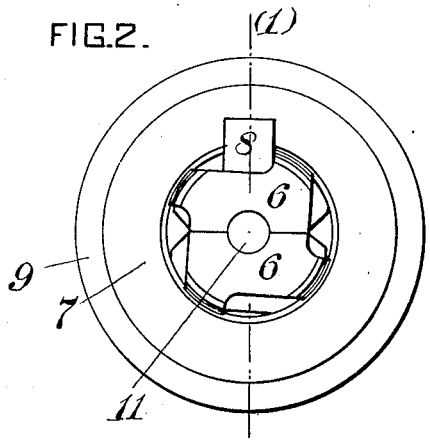
Figure 3:
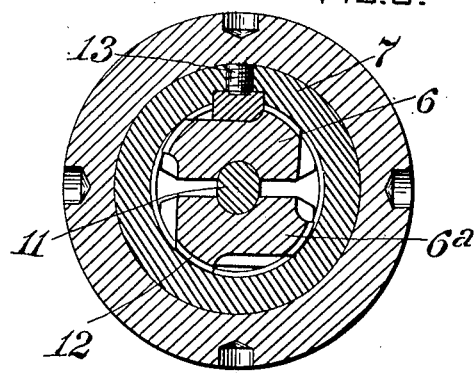

Figure 1 is a central longitudinal section through the tap and the chuck for holding the same on line (1) of Fig. 2; Fig. 2 is an end view, and Fig. 3 is a cross section through the holder ring on line (3) of Fig. 1, and Figs. 4 and 5 are longitudinal sections through a slightly modified form designed to alter the amount of taper of the tap, when this is desired.

In the ordinary tap for cutting taper threads in the ends of pipes and couplings and the like, the front or cutting end of the tap soon wears out, and it cannot be ground off and used further because this would change the diameter of the thread or else the length of the threaded surface. To overcome this difficulty, I make the cutting tool in two parts 6 and 6ª, having thereon the cutting teeth 12 as usual, and these two parts are mounted inside of the tapered and threaded ring 7, in which the two parts are prevented from rotating by means of a key 8 held down by a set screw 13, and the ring 7 is held and clamped inside of a screw ring 9 threaded on the head of the chuck 10, or in any other desired manner. The two parts of the tool 6, and 6ª, are spread apart and fixed in place in the tapered ring 7 by means of a tapered wedge or key 11, as shown in cross section in Fig. 3. The outer end of the two parts of the tap are in contact as shown in Fig. 2, and the rear ends of the parts spread by driving the wedge 11 in place. The ring 7 thus securely carrying the tap is clamped against the chuck 10 by means of the screw ring 9, as will be understood.

By this means it will be seen that the length of thread to be cut is the distance from the end of the tap to the surface of the ring 7, and when the cutting tool becomes worn or broken it may be ground off at the end, and by releasing the wedge 11 it may be collapsed and pushed further forward in the ring 7 and wedged in a new position again with the same length projecting, in the meanwhile maintaining exactly the same taper as before and projecting as far in front of the ring 7 and the chuck as before. It also may be changed at will to cut a different length threaded surface without changing the diameter of the thread in any portion of the length.

Figure 4:
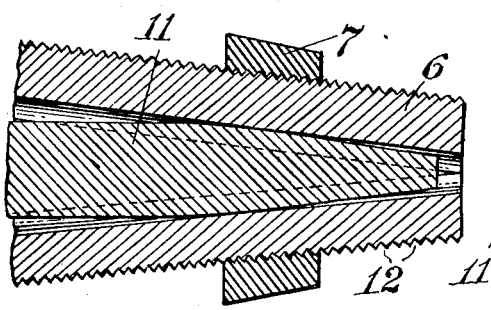
Figure 5:
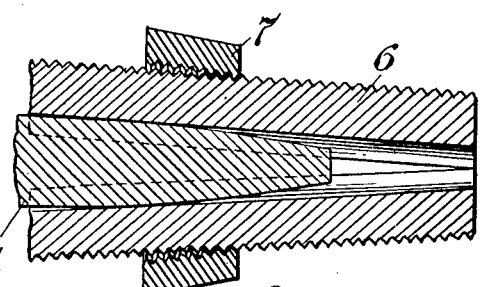

In case it may be desired to alter the inclination of the taper tap, this may be done by practically the same mechanism, as illustrated in Figs. 4 and 5, where the threaded ring 7 is used to hold the two parts 6 together and the key 11 is provided with rounded longitudinal contour so that it may wedge the two parts in place at several angles by causing the cutting tool 6 to extend forward in front of the ring 7 different distances, all of which will be understood from the drawings.

The various advantages of this device, both in adjusting the inclination and in admitting of the use of the entire length of the cutting tool will be readily apparent to those familiar with the art.

Having thus described my invention and illustrated its use, what I claim as new and desire to secure by Letters Patent, is the following:

1. The combination of a holder provided with a threaded ring, a two-part taper tap and a movable wedge within the tap adapted to fasten it in the ring in various positions.

2. The combination with a chuck having a recessed end provided with a screw ring, of a plurality of tapping members extending into the recess in the chuck, a wedge interposed between the tapping members, and a clamping ring encircling the tapping members and secured in position by the said screw ring.

3. The combination of a holder, a two-part taper tap, a threaded taper ring in the holder for containing the tap, and a movable wedge for fastening the parts in said ring.

4. The combination of the ring 7 having a threaded conical opening, the cutters 6, 6ª, fitting therein, and a movable tapered key to tighten the parts in said ring, and means for supporting the ring and preventing the turning of the cutters within the ring.

5. An adjustable taper tap comprising a holder, cutters 6, 6ª, the ring 7 with a conical opening and means for engaging the cutters and preventing their turning within the ring and holder, and a movable wedge for spreading the cutters within said ring, substantially as described.

6. The combination with a chuck, a clamping ring, opposing cutters fitting therein, a tapered key to tighten the parts in the said ring and means for clamping the said ring to the end of the chuck.

7. The combination with a chuck, of opposing cutting members, a wedge for separating the members, a ring encircling the cutting members abutting the end of the chuck and having an inclined outer surface, and a holding ring having an inner inclined surface engaging the outer inclined surface on the other ring and screw threaded to the end of the chuck.

8. An adjustable taper tap comprising in combination a holder, a plurality of cutting tools, a movable wedge inserted between the cutting tools, a ring, wedges inserted between the ring and the cutting tools, and means whereby the cutting tools are held in position on the holder.

In testimony whereof I have hereunto signed my name in the presence of the two subscribed witnesses.

MAURICE PAULSON.

Witnesses:
 ALBERT GRANT MILLER,
 PAUL CARPENTER.